J.G. Klinger.
Shawl Pin &c.
Nº 19.280.   Patented Feb.2.1858

UNITED STATES PATENT OFFICE.

JOHN KLINGER, OF JERSEY CITY, NEW JERSEY, ASSIGNOR TO IGNATIUS STURN, OF NEW YORK, N. Y.

DIAPER OR SHAWL PIN.

Specification of Letters Patent No. 19,280, dated February 2, 1858.

*To all whom it may concern:*

Be it known that I, JOHN G. KLINGER, of Jersey City, in the State of New Jersey, have invented certain new and useful Improvements in Diaper and Shawl Pins, which improvements are based upon the invention of Joshua Heilmann, heretofore patented and assigned to Ignatius Sturn; and I do hereby declare and ascertain my said improvement as follows, referring to the accompanying drawing, in which—

Figure 1:
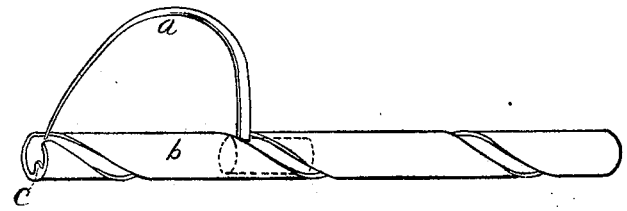
Figure 2:
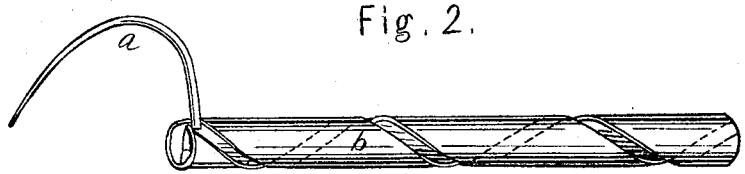

Figure 1 represents the article with the hook or pin retracted within the case; Fig. 2, the same with the hook or pin projected beyond the case.

As in the device of Heilmann I employ a curved pin or hook which is, as in his device thrust beyond and retracted within the case, but instead of a straight slot in the side of the case along which the projecting part of the hook slides, I form the slot in a spiral direction around it, as clearly indicated in the drawing in which $a$ is the hooked pin, $b$ is the case or shield in which the slit winds around in a spiral direction from end to end or a sufficient distance for the purpose intended.

The base of the hook or pin $a$ is affixed to a slide that fits the interior of the shield and slides along within it when the shield is revolved; the spiral slit acting like the thread of a screw upon the shank of the pin or hook $a$ to move it into or out of said shield. If the slide fits tightly in the interior of the shield the friction will retain it in place or a spring catch may be employed if necessary to hold it; at each end the plate forming the shield may be turned up to form a stop $c$ and prevent the slide from becoming detached from the case. These devices are equally applicable to the shield and pin of Heilmann before named.

Having thus fully described my improvements in the curved hook diaper and shawl pin what I claim therein and desire to secure by Letters Patent is—

The spiral shield, the stops, and friction detent all as herein specifically and severally set forth.

JOHN G. KLINGER.

Witnesses:
I. STURN,
J. M. MILLER.